United States Patent [19]

Tipton

[11] Patent Number: 4,711,751
[45] Date of Patent: Dec. 8, 1987

[54] PROCESS AND APPARATUS FOR STRETCHING TUBULAR EXTRUDED PLASTIC MATERIAL

[75] Inventor: Lance W. Tipton, Ashtabula, Ohio
[73] Assignee: Thermo Plastic Research Co., Ltd.
[21] Appl. No.: 690,680
[22] Filed: Jan. 11, 1985
[51] Int. Cl.[4] ............................. B29C 55/26
[52] U.S. Cl. .......................... 264/159; 26/7; 26/72; 26/106; 264/150; 264/151; 264/209.5; 264/288.8; 264/289.6; 425/66; 425/302.1
[58] Field of Search ............... 264/288.8, 290.2, 209.5, 264/DIG. 81, 159, 150, 151, 289.6; 26/71, 72, 73, 7, 106; 425/66, 302.1

[56] References Cited

U.S. PATENT DOCUMENTS

| | | | |
|---|---|---|---|
| 2,659,931 | 11/1953 | Dettmer | 264/290.2 |
| 3,140,330 | 7/1964 | Gutierrez | 264/288.8 |
| 3,193,873 | 7/1965 | Wienand | 264/290.2 |
| 3,217,361 | 11/1965 | Ryan et al. | 264/290.2 |
| 3,246,061 | 4/1966 | Blatz | 264/209.5 |
| 3,296,351 | 1/1967 | Rasmussen | 264/288.8 |
| 3,419,650 | 12/1968 | Ryan | 264/209.5 |
| 3,444,585 | 5/1969 | Watanabe | 26/71 |
| 4,083,667 | 4/1978 | Livingston et al. | 264/DIG. 81 |
| 4,152,479 | 5/1979 | Larsen | 264/167 |
| 4,239,830 | 12/1980 | Ball | 264/209.5 |
| 4,331,624 | 5/1982 | Yazawa et al. | 264/209.5 |
| 4,349,500 | 9/1982 | Yazawa et al. | 264/288.8 |
| 4,434,128 | 2/1984 | Okada et al. | 264/209.2 |
| 4,525,317 | 6/1985 | Okada et al. | 264/290.2 |

FOREIGN PATENT DOCUMENTS

| | | | |
|---|---|---|---|
| 15483 | 9/1962 | Japan | 264/290.2 |
| 41923 | 3/1982 | Japan | 264/290.2 |
| 1113136 | 5/1968 | United Kingdom | 264/290.2 |

Primary Examiner—James Lowe
Attorney, Agent, or Firm—Laff, Whitesel, Conte & Saret

[57] ABSTRACT

A process of stretching tubular nets or plates made of extruded plastic material according to one or two directions at right angles to each other and an equipment for carrying out the same wherein said process consists in dipping the tubular net or plate into heated water, in causing it to be fitted on a substantially flat and wedge-shaped means, dipped into heated water too, and in cutting said net or plate close to at least one of the sides of said wedge-shaped means; and wherein said equipment consists of a substantially flat and wedge-shaped means disposed on a bearing casing and defined by a plurality of driving and idler pulleys disposed symmetrically two by two with respect to a vertical median plane of the equipment, in order to substantially define a wedge, said pulleys being drivingly connected to each other by at least a driving belt.

10 Claims, 5 Drawing Figures

PROCESS AND APPARATUS FOR STRETCHING TUBULAR EXTRUDED PLASTIC MATERIAL

BACKGROUND OF THE INVENTION

1. Field of the Invention

The present invention relates to a process of stretching tubular nets or plates made of extruded plastic material coming out of an extruder or extrusion head, according to one or two directions at right angles to each other and to the equipment for carrying out the same.

The process and the equipment in question are particularly used in the field of the processings applied to plastic materials capable of being deformed and extended where, starting from the step in which the material is extruded in the form of a continuous plate, or sheet it is possible to obtain a stretched finished product which can take the form of a solid even plate, a perforated plate provided with differently disposed and shaped holes or even of a real net.

2. Prior art

At present, in order to obtain the stretching of plates or nets made of extruded plastic material according to two directions at right angles to each other, very complicated equipments are used that carry out the longitudinal and transverse stretch operations in two steps and in two succeeding stations.

One of these equipments is disclosed in U.S. Pat. No. 4,152,479 issued on May 1st, 1979 which you can refer to for more details.

Substantially the apparatus shown therein comprises a plurality of stretching rollers disposed one after the other with the respective axes parallel to each other. The material coming out of the extrusion head, either in the form of a net or of a plate, is caused to pass through said rollers which are rotated at differentiated rates. In order to make the stretch operation easier, rollers are suitably heated so that they can transmit heat by conduction to the product coming in contact with them.

Owing to the differentiated rates of said rollers, longitudinal stresses take place in the pre-heated product which cause the product to be stretched in this sense. Once the product has been longitudinally stretched, the net or plate is fed to a further equipment comprising two chains of pliers or grippers disposed along the sides of the net or plate. The chains follow a path that first extends parallelly to the axis of the net or plate, then opens wide apart therefrom and finally runs parallelly to said axis again. In this way pliers or grippers can grasp the net or plate coming from the set of rollers at the edges thereof and draw it transversely along the path until it reaches the desired width.

In order to assist the stretch operation in a transverse direction on the net or plate, hot air is continuously blown in.

A takeup pulley disposed downstream of the pliers chains is provided in order to limit the longitudinal shrinkage of the net or plate which inevitably occurs during the transverse stretch operation.

Although equipments of the kind described above have been widely used in stretching nets or plates, they have many drawbacks and limitations both from a technical and operational standpoint and from a pratical one.

A first drawback that can easily be found is given by the fact that these equipments can carry out the longitudinal and transverse stretch operations only on nets or plates of a reduced thickness. In fact, referring above all to nets, the metal rollers used in the longitudinal stretch operation are capable of transmitting only a reduced amount of heat to the wires constituting the nets, as the contact surfaces between the rollers and the wires appear very small with respect to the whole surface of the wires. Finally, wires can be heated in a suitable manner only if they have a very thin cross-section; in fact, should their section be thicker, they would be heated on the surface only and, by effect of the drawing stresses, they would break. The same remarks are also valid when the net passes through the transverse stretch station, as the heating means, that is the air blown in, has a substantially low specific heat which allows a suitable heating of the net only if it is made from thin wires.

Therefore, by using the equipments described above it is not possible to carry out a stretch operation on the nets when the wires constituting the same have a thick section, due to the fact that the heating means (a mere contact between a metal surface and the wire or the blowing in of hot air) appears inadequate.

A further drawback linked to the above equipments is given by the presence of pliers grasping the edges of a net or a plate during the transverse stretch step. It should be noted first that the grasp of said pliers is discontinuous and that no kind of stretching can be executed on the area caught by the pliers. As a result, the edges of the net appear more compact. As a consequence of that, when the finished product is wound around a reception bobbin, the winding of the side edges is more tensioned, which can cause the net to be broken just along the edges thereof. Furthermore, this kind of break can also take place rather often during the transverse stretch step when the pliers, being subjected to a sudden straddle, exert a transverse jerking action on the net.

A further drawback linked to the prior art described above is given by the fact that these equipments have big sizes and take up too much room inside a factory. Usually the plan bulkness of these equipments takes up many tens of square meters.

A still further drawback, linked to the stretch technique carried out by two succeeding longitudinal and transverse tensioning steps of the net is given by the fact that, on their junction points, the wires are considerably stretched which gives rise to the formation of rather flattened knots. For this reason, when nets are used and there is the occurrence of stresses that are not in the same direction as the wires but in a bias direction, owing to the very reduced possibility of deformation of plastic material at room temperature, the knots tend to crack which causes the net to be broken.

A still further drawback linked to the inherent structure of the machines presently used is given by the fact that when nets of different widths have to be obtained, it is always necessary to stop the equipments and carry out a series of adjustments, which requires time and labour and consequently adversely affects the cost of the finished product.

OBJECTS

It is therefore a main object of the present invention to obviate the above mentioned drawbacks providing a process and an equipment which are capable of carrying out the steps of longitudinal and transverse stretchings of a net or plate made of extruded plastic material at the same time and in a single station, by the use of a heating means having a high specific heat.

A further object of the present invention is to avoid the extruded plastic material to be brought into contact with rigid grasping means, the same being transferred by contact using means capable of being elastically deformed.

A further object of the present invention is to provide an equipment the sizes of which are smaller than the corresponding traditional equipments', so that it takes up a smaller room inside a factory.

SUMMARY OF THE INVENTION

The above and further objects which will become more apparent in the following are attained, according to the present invention, by a process of stretching tubular nets or plates made of extruded plastic material coming out of an extruder or extrusion head, according to one or two directions at right angles to each other, comprising the steps of: dipping the tubular net or plate into a heating means into which a substantially flat and wedge-shaped means has been previously introduced; causing said tubular net or plate to fit on said wedge-shaped means, at the level of the wedge vertex, and to move forward along the same; cutting said tubular net or plate moving forward along the wedge-shaped means at least close to one of the sides of the wedge-shaped means by means of cutting members disposed in the vicinity of the base of the wedge; and finally moving the product thus obtained away from the processing area, sending it, through idler rollers, to the reception bobbins on which it is wound.

Advantageously and in accordance with a further feature of the present invention, the equipment for stretching nets or plates made of extruded plastic material coming out of an extruder or extrusion head, according to one or two directions at right angles to each other, comprises: a substantially flat and wedge-shaped means disposed on a bearing casing and defined by a plurality of driving and idler pulleys disposed symmetrically two by two with respect to a vertical median plane of the equipment in order to substantially define a wedge and by at least a driving belt kinematically connecting the pulleys to each other, a tubular net or plate made of plastic material being slipped, from vertex to base, on said wedge-shaped means; a pair of cutting members acting along the sides of the wedge-shaped means substantially close to the base of the latter; and a pair of idler rollers disposed on two opposite faces of the wedge-shaped means in order to move the product obtained in the form of two distinct flat nets or plates away from the processing area and according to opposite directions, drive means being provided for actuating the driving and idler pulleys at the same rate or at differentiated rates.

BRIEF DESCRIPTION OF THE DRAWINGS

Further features and advantages of the invention will become more apparent from the detailed description of a preferred embodiment of a process of and equipment for stretching tubular nets or plates made of extruded plastic material, according to two directions at right angles to each other, given hereinafter by way of example only with reference to the accompanying drawings, in which.

DESCRIPTION OF THE PREFERRED EMBODIMENTS

Figure 1:
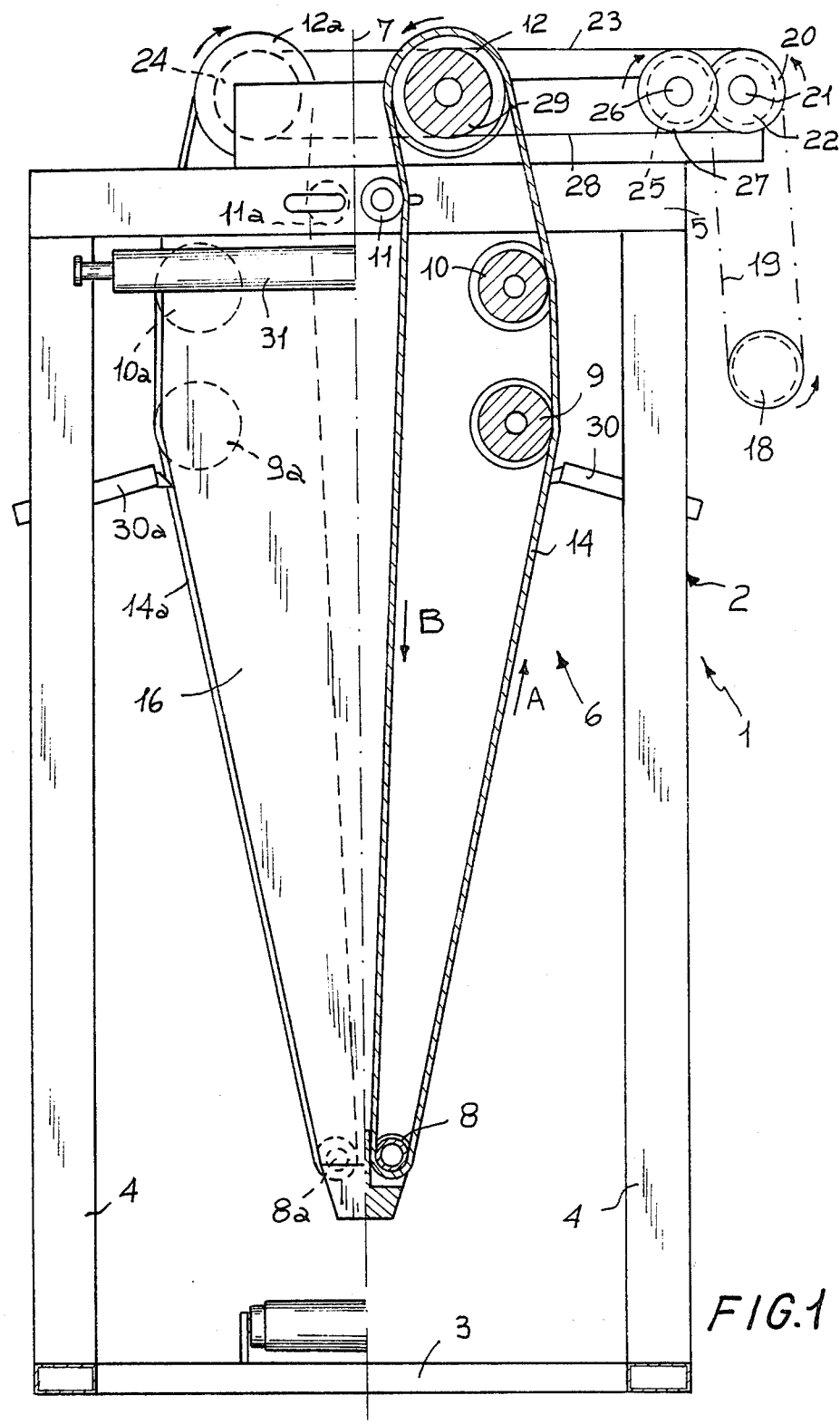
FIG. 1 is an elevated front view, partially in section, of the equipment according to the present invention.

Referring to the above mentioned drawings, the process of stretching tubular nets or plates made of extruded plastic material according to two directions at right angles to each other contemplates the use of an equipment as generally indicated at 1. Said equipment consists of a bearing casing 2 substantially made up of a base 3 on which posts 4 stand; at the top said posts are joined together by cross-pieces 5.

The casing 2 bears a substantially flat and wedge-shaped means generally indicated at 6. The means 6 is essentially defined by a plurality of driving and idler pulleys disposed symmetrically two by two with respect to a vertical median plane 7 of the equipment 1. The pulleys lying on the righthand side of plane 7 with reference to FIG. 1 have been allocated the reference numerals 8, 9, 10, 11 and 12, while the opposite pulleys have been allocated the reference numerals 8a, 9a, 10a, 11a and 12a respectively.

Figure 4:
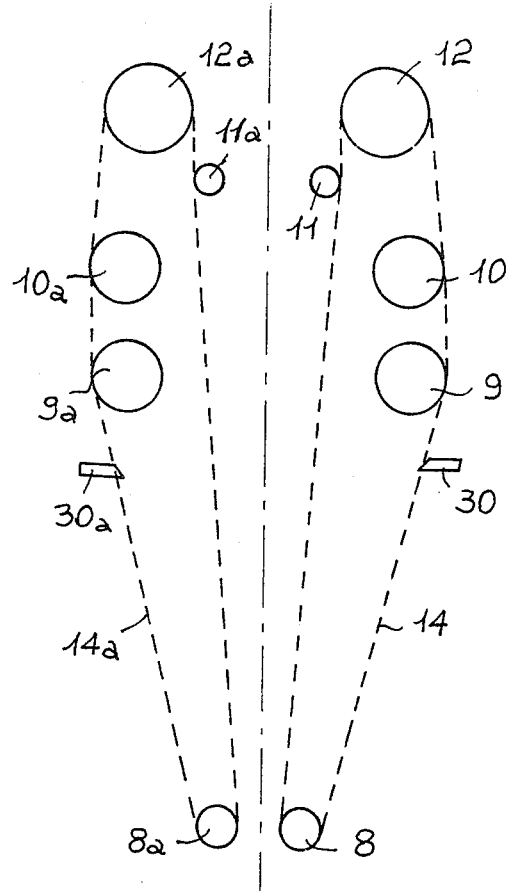
FIG. 4 is a diagrammatic view of the wedge-shaped means according to another embodiment thereof.
Figure 3:
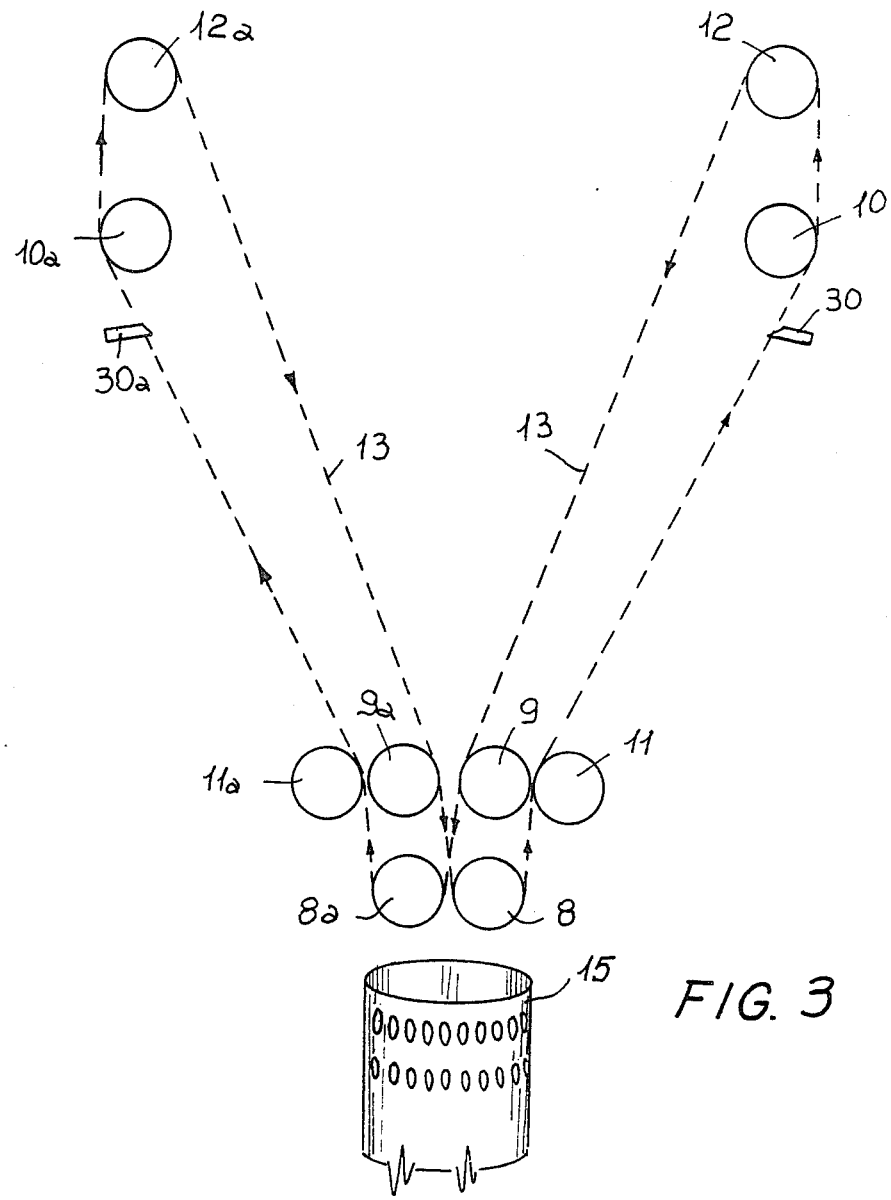
FIG. 3 is a diagrammatic view of the wedge-shaped means according to one embodiment thereof.

As it is possible to see in the figures, said pulleys have the form of a wedge the vertex of which is turned downwards. Said pulleys can be drivingly connected to each other by means of a single driving belt, as seen in FIG. 3, where said belt has been indicated at 13, or by means of two distinct driving belts indicated at 14 and 14a respectively in FIGS. 1 and 4.

As it is possible to see in FIG. 1, the belts clearly project from the races of the pulleys in which they are engaged in order to constitute the means that comes directly into contact with the tubular net or plate and that causes the same to move forward along the wedge-shaped member.

The drive connection via belts is a preferred embodiment; in fact, as shown in more detail in the following, when a tubular net or plate 15 (FIGS. 3 and 4) has to be slipped on the wedge-shaped means 6 in order to carry out the transverse and longitudinal stretch operations thereon, said net or plate will be grasped and dragged along by friction by stretchable or elastic means, in this case belts 13, 14 and 14a. However normal driving chains could also be used instead of belts but they would only allow the transverse stretching and not a stretching in the two directions at the same time.

Figure 2:
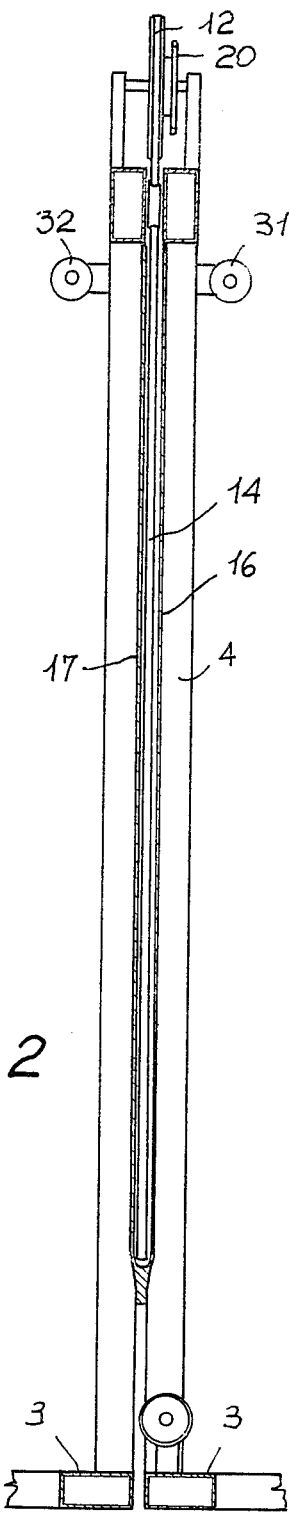
FIG. 2 is a side view of the equipment seen in FIG. 1.

The wedge-shaped means 6 also comprises a pair of metal plates 16 and 17 (FIGS. 1 and 2) in the shape of a wedge too, which enclose the above mentioned plurality of pulleys and respective belts without however projecting beyond the outer peripheral edge of the belts.

A suitable driving means causes the driving pulleys 12 and 12a of the equipment to rotate.

By way of example only, a driving wheel 18 carried by the drive shaft, through a belt or chain 19 transmits the motion to a pulley 20 fitted on a shaft 21 on which a toothed wheel 22 is mounted. Pulley 20 is drivingly connected, through a belt or chain 23, to a pulley 24 fitted on the same shaft bearing pulley 12a.

The toothed wheel 22 operatively engages with a toothed wheel 25 carried by a shaft 26 on which another pulley 27 is fitted. Pulley 27 is drivingly connected, through a belt or chain 28, to a pulley 29 fitted on the same shaft on which pulley 12 is mounted.

In this way, when the wheel 18 is operated, pulleys 12 and 12a are rotated in opposite directions with respect to each other.

Pulleys 8 and 12 and 8a and 12a can be drivingly connected to each other through means not shown in the figures, in order to allow the same to rotate at differentiated peripheral speeds so that, once the tubular net or plate has been slipped on means 6, the longitudinal stretching can be accomplished.

It should be understood that the belts or chains not shown, which accomplish the connection between pulleys 12 and 8 and 12a and 8a have no part in bearing the tubular net or plate and in dragging it along; in fact they only cause a differentiated peripheral speed between the pulleys. More particularly, the peripheral speed of pulleys 12 and 12a is faster than the peripheral speed of pulleys 8 and 8a, depending upon the ratio of the longitudinal stretching. On the contrary, the task of carrying the tubular net or plate and dragging it along is accomplished by belts 14 and 14a or 13. More particularly, by effect of their elastic characteristics, in operation the belts will be drawn and therefore will grow longer along their ascendant portion from pulleys 8 and 8a to pulleys 12 and 12a according to the direction of arrow A in FIG. 1 while they will become shorter during their descendant portion as shown by the arrow B.

Obviously, should chains be used instead of belts in order to carry out the dragging operation in which case only a transverse stretching is obtained, the peripheral speeds of pulleys 8, 8a, 12 and 12a will have to be all identical.

The equipment according to the present invention further comprises a pair of cutting members 30 and 30a acting along the sides of the wedge-shaped means 6, substantially at the base of the wedge. The cutting members 30 and 30a are suitable to be moved along the sides of the wedge-shaped means 6, by traditional means known in itself, in order to allow the net or plate to be cut at the selected width.

Finally the equipment 1 is provided with a pair of idler pulleys 31 and 32 (FIGS. 1 and 2) disposed close to two opposed faces of the wedge-shaped means in order to allow the product, which is now in the form of two distinct flat nets or plates, to be moved away from the processing area.

The process of stretching tubular nets or plates made of extruded plastic material according to two directions at right angles to each other contemplates the use of a fluid having a high specific heat, preferably water, as a heating means. To this end the equipment 1 acts being immersed in water at least up to the height of the cutting members 30 and 30a. In case of polymers easy to be stretched at a temperature close to the room temperature, the heating means could consist of a number of infrared ray lamps that will direct their beams of light towards the net or plate moving forward along the wedge-shaped means.

According to the process of the present invention it is provided that the tubular net or plate made of extruded plastic material coming out of an extruder or extrusion head is dipped into water and slipped, from bottom to top, on the wedge-shaped means 6. By actuating the equipment 1, belts 14 and 14a exert a friction on the tubular net or plate causing it to move upwards until it comes into contact with the cutting members 30 and 30a. At this point the tubular net or plate is divided into two flat nets or plates which are caused to pass on pulleys 31 and 32 and then are moved away from the processing area being then wound on reception bobbins not shown in the figures.

As an alternate embodiment only a single cutting member is provided and in this case only one flat net or plate can be obtained which obviously has a double width.

Clearly, when belts 13 or 14 and 14a cause the net or plate to be slipped on the wedge-shaped means, the latter undergoes a longitudinal stretching for the above specified reasons and a transverse stretching at the same time by effect of the straddling action exerted by the belts.

By virtue of the simultaneous stretching action exerted on the net or plate in the two orthogonal directions and of the heating means which succeeds in transferring a sufficient amount of heat to the polymer in a short lapse of time so that it is made malleable, it is possible to carry out hitherto unthinkable processings on heavy nets or plates.

Figure 5:
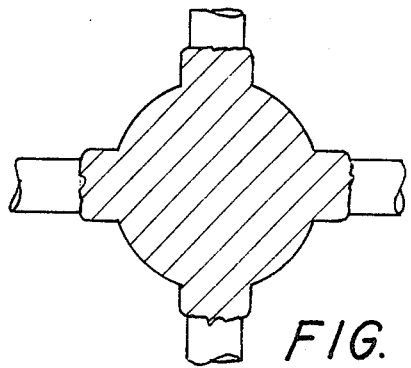
FIG. 5 shows, to an enlarged scale and with reference to a net, a knot obtained in accordance with the process and equipment of the present invention.

Furthermore, in the case of nets, the knots are not completely flattened but they remain in the form of cores or crumbs which represent an appropriate reservoir of polymer allowing the nets to stand the stress actions that might be exerted not only along the direction of wires but also in a bias direction. The shape of the knots in nets obtained in accordance with the stretching process of the present invention is clearly shown in FIG. 5 of the accompanying drawings.

The invention attains the intended purposes, that is the obtention of thoroughly uniform stretched nets or plates devoid of weak points.

In addition, the sizes of the equipment of the invention are much smaller; in fact, its width is reduced to one half and its length to one third by virtue of the fact that the whole rectilinear portion for pre-heating the nets or plates during the transverse stretching step by means of air is no more necessary.

Furthermore, if one wishes to change the width of the product thus stretched, it is not necessary to stop the processing for a long time in order to change the distance between the pliers chains, but it is sufficient to lower and move the cutting members 30 and 30a nearer, which operation is quick and easy to be carried out.

Furthermore, it should be understood that, being the product thus obtained submitted to strictly constant transverse stresses over the whole width thereof, it appears perfectly uniform, that is without the so-called "selvages" existing along the edges of the flat nets or plates obtained by the processes and equipments of the prior art.

Obviously many structural modifications and variations can be made to the process and the equipment for stretching tubular nets or plates made of extruded plastic material according to two directions at right angles to each other, according to the present invention, without departing from the spirit and scope of the invention itself.

Particularly, the equipment here described is disposed so that the vertex of its wedge-shaped member is turned downwards, however it can be used in any other positioning condition. For example it can be disposed in such a way that the vertex of the wedge-shaped member is turned upwards or even in a horizontal position.

What is claimed is:

1. A process of stretching tubular extruded plastic material comprising the steps of placing a substantial portion of a wedge-shaped means having a vertex end and a base end into a fluid heating means, said wedge-shaped means being formed by belt means traveling over appropriate pulleys, with a first pair of pulleys forming a vertex end, and a second pair of pulleys forming the base of the wedge-shaped means, dipping the tubular plastic material into said heating means and onto the vertex end of said wedge-shaped means, driving the first pair of pulleys at a circumferential speed less than the second pair of pulleys, said belt means accommodating the speed differential between the first and second pair of pulleys, contacting the inner surface of the plastic tube with the belt means to move the plastic tube toward the base of the wedge-shaped means and thereby stretching the plastic tube, cutting said tube moving forward along the wedge-shaped member close to both sides of said wedge-shaped member by means of cutting means disposed in the vicinity of the base of the wedge to provide two separate plastic sheets; and finally moving the two separate sheets thus obtained over idler rollers.

2. The process according to claim 1 wherein said dipping step takes place using water as a heating means.

3. The process of claim 1 wherein the tubular plastic is unperforated.

4. The process of claim 1 wherein the tubular plastic material is a net.

5. Apparatus for stretching tubes made or extruded plastic material coming out of an extruder comprising: a substantially flat and wedge-shaped means disposed on a bearing casing, said wedge-shaped means being formed by a plurality of driving and idler pulleys disposed symmetrically two by two with respect to a vertical median plane and substantially defining a wedge with a vertex end and a base end, said vertex end being formed by a first pair of pulleys being separated by said vertical median plane, said first pair of pulleys being sized and spaced a predetermined distance apart so as to fit within the extruded plastic tube placed thereover, said base end being formed by a second pair of pulleys spaced a predetermined distance apart and further apart than said first pair of pulleys to form a wedge-shape which will stretch the plastic tube, belt means connecting the pulleys to each other, said belt means being adapted to contact the inner surface of the extruded plastic tube to move said plastic tube from the vertex toward the base of the wedge-shaped means, said first pair of pulleys being driven at a lesser circumferential speed than the second pair of pulleys and said belt means accommodating the speed differential between the first and second pair of pulleys, a pair of cutting members positioned a predetermined distance above said vertex and adapted to cut the extruded plastic tube into two distinct sheets after it is stretched, a pair of idler rollers disposed on two opposite faces of the wedge-shaped means in order to move the two distinct sheets away from the processing area in opposite directions, and drive means being provided for driving the pulleys.

6. The apparatus according to claim 5 wherein each set of symmetrically disposed pulleys is provided with its own driving belt drivingly connecting the pulleys.

7. The apparatus according to claim 5 wherein said cutting members are movable along the sides of the wedge-shaped means so that they allow the plastic tube to be cut according to a selected width.

8. The apparatus of claim 5 wherein the belt means is a single belt for both sets of symmetrically disposed pulleys.

9. The apparatus of claim 5 wherein the plurality of pulleys form two sets of pulleys with each set containing at least four pulleys, drive means to drive the vertex pulleys at a circumferential speed less than the base pulleys, and said belt means accommodating the speed differential between the base and vertex pulleys.

10. Apparatus for stretching tubes made of extruded plastic material coming out of an extruder comprising: a substantially flat and wedge-shaped means disposed on a bearing casing, said wedge-shaped means being formed by a plurality of driving and idler pulleys disposed symmetrically two by two with respect to a vertical median plane and substantially defining a wedge with a vertex end and a base end, said vertex end being formed by a first pair of pulleys being separated by said vertical median plane, said first pair of pulleys being sized and spaced a predetermined distance apart so as to fit within the extruded plastic tube placed thereover, said base end being formed by a second pair of pulleys spaced a predetermined distance apart and further apart than said first pair of pulleys to form a wedge-shape which will stretch the plastic tube, belt means connecting the pulleys to each other, said belt means being adapted to contact the inner surface of the extruded plastic tube to move said plastic tube from the vertex toward the base of the wedge-shaped means, said wedge-shaped means having a pair of metal plates in the form of a wedge enclosing said plurality of pulleys and said driving belt without projecting beyond the peripheral edge thereof, a pair of cutting members positioned a predetermined distance above said vertex and adapted to cut the extruded plastic tube into two distinct sheets after it is stretched, a pair of idler rollers disposed on two opposite faces of the wedge-shaped means in order to move the two distinct sheets away from the processing area in opposite directions, and drive means being provided for driving the pulleys.

* * * * *